US009847172B2

(12) United States Patent
Kim et al.

(10) Patent No.: US 9,847,172 B2
(45) Date of Patent: Dec. 19, 2017

(54) EMBEDDED DEVICE, AND PRINTED CIRCUIT BOARD HAVING THE SAME

(71) Applicant: SAMSUNG ELECTRO-MECHANICS CO., LTD., Suwon-Si, Gyeonggi-Do (KR)

(72) Inventors: Hye Seong Kim, Suwon-Si (KR); Eun Sang Na, Suwon-Si (KR); Jin Sung Kim, Suwon-Si (KR); Ok Nam Kim, Suwon-Si (KR); Tae Hyeok Kim, Suwon-Si (KR); Jin Man Jung, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 42 days.

(21) Appl. No.: 14/920,735

(22) Filed: Oct. 22, 2015

(65) Prior Publication Data

US 2016/0174380 A1   Jun. 16, 2016

(30) Foreign Application Priority Data

Dec. 15, 2014 (KR) ........................ 10-2014-0180353

(51) Int. Cl.
*H05K 1/03* (2006.01)
*H01G 4/232* (2006.01)
(Continued)

(52) U.S. Cl.
CPC .............. *H01G 4/232* (2013.01); *H01G 4/12* (2013.01); *H01G 4/30* (2013.01)

(58) Field of Classification Search
CPC .. H05K 1/02; H05K 1/09; H05K 1/18; H05K 1/03; H05K 3/30; H01G 4/08; H01G 4/12;
(Continued)

(56) References Cited

U.S. PATENT DOCUMENTS 5,107,394 A * 4/1992 Naito .................... H01C 17/281
 29/25.42
5,251,094 A * 10/1993 Amano ................ H01G 4/2325
 29/25.42

(Continued)

FOREIGN PATENT DOCUMENTS

JP       2012-033621 A    2/2012
KR   10-2012-0042812 A    5/2012

*Primary Examiner* — Xiaoliang Chen
(74) *Attorney, Agent, or Firm* — McDermott Will & Emery LLP

(57) ABSTRACT

An embedded device includes a multilayer body including dielectric layers and internal electrode layers interposed between adjacent dielectric layers; external electrodes disposed on external surfaces of the multilayer body to apply electric charges having different polarities to adjacent internal electrode layers, the external electrodes containing a conductive material; first copper layers disposed on external surfaces of the external electrodes to cover the external electrodes; and second copper layers disposed on the first copper layers to cover the first copper layers. An average particle diameter of powder particles of the first copper layers is greater than an average particle diameter of powder particles of the second copper layers.

15 Claims, 3 Drawing Sheets

(51) Int. Cl.
*H01G 4/12* (2006.01)
*H01G 4/30* (2006.01)

(58) Field of Classification Search
CPC .......... H01G 4/30; H01G 4/228; H01G 4/232; H01G 13/00; H01C 17/28; H01C 1/14; H01C 1/148
USPC ..... 174/255, 257, 260, 258, 565; 361/301.4, 361/306.3, 321.2, 308.2, 309; 438/253
See application file for complete search history.

(56) References Cited

U.S. PATENT DOCUMENTS

| | | | | |
|---|---|---|---|---|
| 6,259,594 B1* | 7/2001 | Mizuno | ................ | H01G 4/1227 361/321.2 |
| 8,094,432 B2* | 1/2012 | Motoki | ................ | H01G 4/005 361/306.1 |
| 8,102,640 B2* | 1/2012 | Ogawa | ................ | H01G 4/005 361/306.3 |
| 8,508,912 B2* | 8/2013 | Yamamoto | ............ | H01G 4/232 361/306.1 |
| 9,653,211 B2* | 5/2017 | Kisumi | ................ | H01G 4/0085 |
| 2001/0007522 A1* | 7/2001 | Nakagawa | ........... | H05K 3/3426 361/301.4 |
| 2001/0043454 A1* | 11/2001 | Yoshii | ................ | H01G 4/232 361/321.2 |
| 2002/0046861 A1* | 4/2002 | Yokoyama | ............ | H01C 1/148 174/565 |
| 2006/0193103 A1* | 8/2006 | Yoshii | ................ | H01G 4/008 361/306.3 |
| 2007/0128794 A1* | 6/2007 | Kusano | ................ | H01G 4/2325 438/253 |
| 2008/0081200 A1* | 4/2008 | Katsube | ............... | H01G 4/2325 428/457 |
| 2008/0305944 A1* | 12/2008 | Ueda | ................... | C01G 25/006 501/137 |
| 2008/0310077 A1* | 12/2008 | Itamura | ................ | H01G 4/228 361/306.3 |
| 2009/0296311 A1* | 12/2009 | Otsuka | ................ | H01G 2/065 361/306.3 |
| 2009/0323253 A1* | 12/2009 | Kobayashi | ............ | H01G 4/005 361/301.4 |
| 2010/0020464 A1* | 1/2010 | Iwanaga | ................ | H01G 4/005 361/301.4 |
| 2011/0252629 A1* | 10/2011 | Kunishi | ................ | H01G 4/105 29/592.1 |
| 2011/0287176 A1* | 11/2011 | Saito | ...................... | H01G 4/224 427/126.2 |
| 2012/0186861 A1* | 7/2012 | Shimizu | .............. | H01L 23/5389 174/255 |
| 2012/0196032 A1* | 8/2012 | Katsube | ............... | H01G 4/2325 427/123 |
| 2013/0088810 A1* | 4/2013 | Yang | .................... | H01G 4/2325 361/306.3 |
| 2013/0128411 A1* | 5/2013 | Tahara | .................... | C25D 3/56 361/321.2 |
| 2013/0192884 A1* | 8/2013 | Furutani | ................ | H05K 1/185 174/258 |
| 2013/0194764 A1* | 8/2013 | Mikado | .................. | H05K 1/185 361/761 |
| 2013/0208401 A1* | 8/2013 | Shirakawa | ............. | H01G 13/06 361/305 |
| 2013/0223033 A1* | 8/2013 | Mano | .................. | H01F 17/0013 361/763 |
| 2014/0063684 A1* | 3/2014 | Lee | .......... | H01G 4/30 361/301.4 |
| 2014/0204502 A1* | 7/2014 | Chun | ...................... | H01G 4/30 361/301.4 |
| 2014/0347783 A1* | 11/2014 | Kisumi | .................... | H01B 1/22 361/301.4 |
| 2014/0360765 A1* | 12/2014 | Kiwanami | ............. | H05K 1/185 174/260 |
| 2015/0022945 A1* | 1/2015 | Park | ..................... | H01G 4/2325 361/301.4 |
| 2015/0041196 A1* | 2/2015 | Kim | ..................... | H01G 4/30 174/260 |
| 2015/0085422 A1* | 3/2015 | Kim | ..................... | H01G 4/2325 361/301.4 |
| 2015/0090483 A1* | 4/2015 | Moon | ...................... | H01G 4/30 174/260 |
| 2015/0237714 A1* | 8/2015 | Coutts | ................. | H05K 1/0231 174/257 |
| 2015/0325375 A1* | 11/2015 | Song | ........................ | H01G 2/02 174/260 |
| 2015/0340425 A1* | 11/2015 | We | .......................... | H01L 28/40 257/532 |

\* cited by examiner

EMBEDDED DEVICE, AND PRINTED CIRCUIT BOARD HAVING THE SAME

CROSS-REFERENCE TO RELATED APPLICATION

This application claims the benefit of priority to Korean Patent Application No. 10-2014-0180353, filed on Dec. 15, 2014 with the Korean Intellectual Property Office, the entirety of which is incorporated herein by reference.

BACKGROUND

The present disclosure relates to an embedded device, and a printed circuit board having the same.

In accordance with the densification and integration of electronic circuits, available space for the mounting of devices on printed circuit boards has become insufficient in many cases. In order to solve this problem, efforts to implement devices embedded in a board have been made.

In particular, various methods of embedding ceramic devices used as capacitive components in printed circuit boards have been suggested.

Generally, external electrodes of embedded devices contain glass frit, and a component contained in the glass frit may absorb the energy of a laser beam at the time of performing laser processing to form a via hole in the board, such that a processing depth of the via hole may not be properly formed.

For this reason, a copper (Cu) plating layer may be formed separately on the external electrode of the embedded device.

SUMMARY

An aspect of the present disclosure may provide an embedded device in which the deterioration of certain characteristics of the embedded device may be prevented, and a printed circuit board having the same.

According to an aspect of the present disclosure, an embedded device comprises a multilayer body including dielectric layers and internal electrode layers interposed between adjacent dielectric layers; external electrodes disposed on external surfaces of the multilayer body to apply electric charges having different polarities to adjacent internal electrode layers, the external electrodes containing a conductive material; first copper layers disposed on external surfaces of the external electrodes to cover the external electrodes; and second copper layers disposed on the first copper layers to cover the first copper layers, wherein an average particle diameter of powder particles of the first copper layers is greater than an average particle diameter of powder particles of the second copper layers.

The first copper layers may have a thickness of 0.1 µm to 4 µm.

The conductive material may include at least one of copper, nickel, and alloys thereof.

According to another aspect of the present disclosure, a printed circuit board having an embedded device comprises the embedded device; a core part having a cavity; and a circuit pattern formed on the core part, wherein the embedded device is disposed in the cavity.

The printed circuit board may further comprise a filler interposed between at least a portion of an inner peripheral surface of the cavity and the embedded device.

The printed circuit board may further comprise a through-hole formed in the filler to electrically connect the circuit pattern and the external electrodes to each other.

BRIEF DESCRIPTION OF DRAWINGS

The above and other aspects, features and other advantages of the present disclosure will be more clearly understood from the following detailed description taken in conjunction with the accompanying drawings.

DETAILED DESCRIPTION

Figure 1:
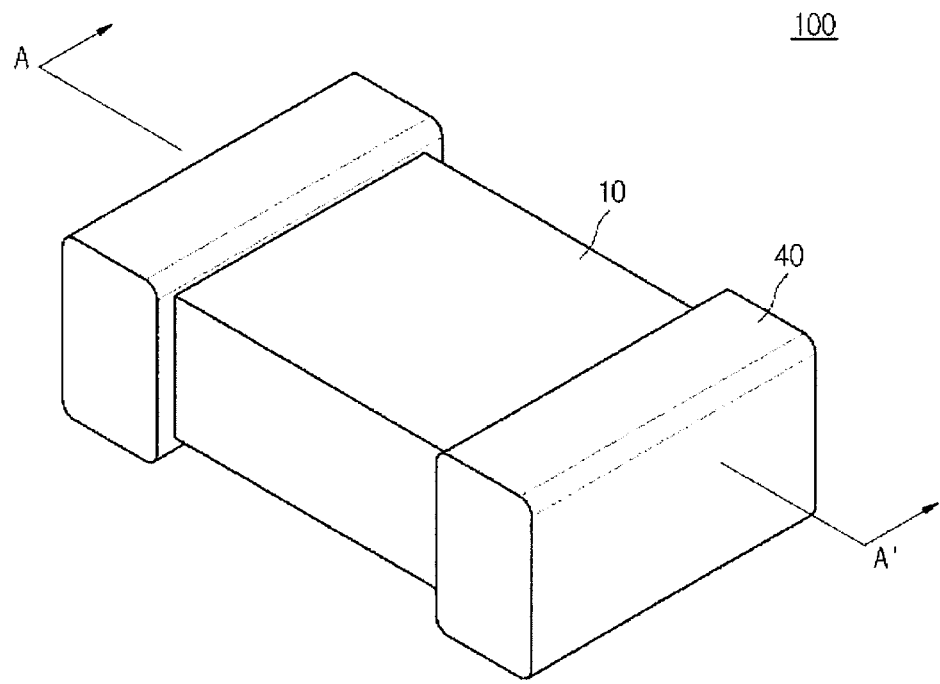
FIG. 1 is a perspective view illustrating an embedded device according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
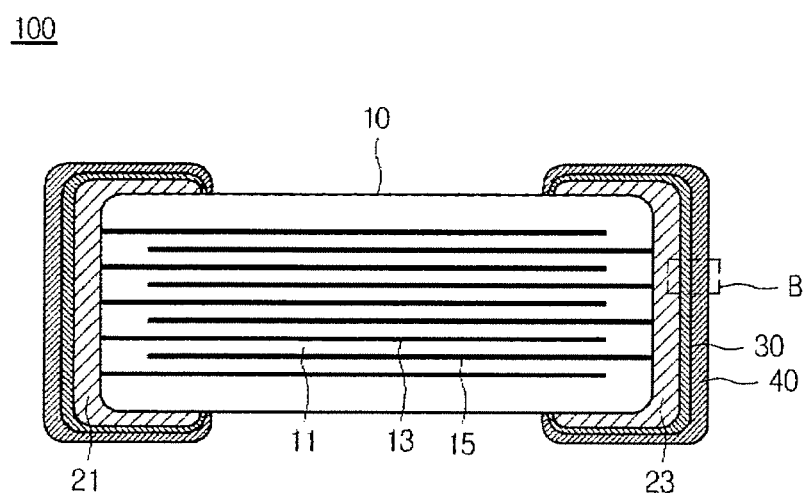
FIG. 2 is a cross-sectional view of the embedded device according to an exemplary embodiment in the present disclosure taken along line A-A' of FIG. 1.
Figure 3:
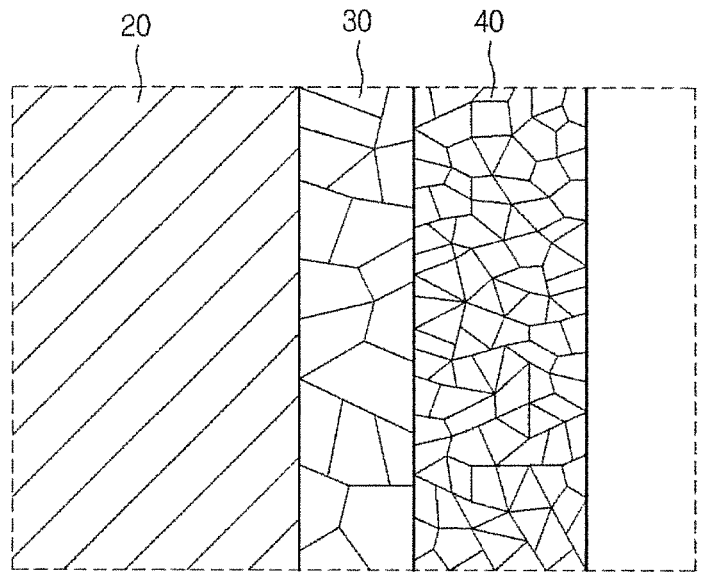
FIG. 3 is an enlarged view of part B of FIG. 2.

FIG. 1 is a perspective view illustrating an embedded device according to an exemplary embodiment in the present disclosure. FIG. 2 is a cross-sectional view of the embedded device according to an exemplary embodiment in the present disclosure taken along line A-A' of FIG. 1. FIG. 3 is an enlarged view of part B of FIG. 2.

As illustrated in FIGS. 1 through 3, an embedded device 100 according to an exemplary embodiment in the present disclosure may include a multilayer body 10, external electrodes 20, first copper layers 30, and second copper layers 40.

The multilayer body 10 may include dielectric layers 11 and internal electrode layers 13 and 15 interposed between adjacent dielectric layers 11. For instance, the dielectric layers 11 and the internal electrode layers 13 and 15 may be alternately layered to form the multilayer body 10.

The dielectric layers 11 may have a plate shape. The number of dielectric layers 11 illustrated in FIG. 2 may be changed depending on a design or process convenience.

The dielectric layer 11 may contain a material having dielectric characteristics, for example, a ceramic material. Hereinafter, although a case in which the dielectric layer 11 contains a ceramic material as the dielectric material has been described for convenience of explanation, the dielectric layer 11 is not limited to containing the ceramic material, but may also contain a polymer material having dielectric characteristics, or the like.

Internal electrode layers 13 and 15 to be described below may be formed on upper and lower surfaces of the dielectric layers 11, respectively. In a case in which electric charges having different polarities are applied to adjacent internal electrode layers 13 and 15, dipoles may be generated in the dielectric layers 11. The multilayer body 10 may be mechanically displaced (in a case in which the embedded device is a piezoelectric element) or electric charges may be charged therein (in a case in which the embedded device is a capacitor) by the dipoles of the dielectric layers 11.

The internal electrode layers 13 and 15 may be interposed between adjacent dielectric layers 11. The internal electrode layers 13 and 15 may have a plate shape.

A manner in which the internal electrode layers 13 and 15 are stacked will be described with reference to FIG. 2 and an example of the internal electrode layers 13 and 15 respectively formed on upper and lower surfaces of one dielectric layer 11. The internal electrode layer 13 formed on the upper surface of the dielectric layer 11 may be extended to one end of the dielectric layer 11 to thereby be extended to one end of the multilayer body 10. The internal electrode layer 15 formed on the lower surface of the dielectric layer 11 may be extended to the other end of the dielectric layer 11 to thereby be extended to the other end of the multilayer body 10. For instance, the internal electrode layers 13 and 15 may be alternately extended to one end and the other end of the multilayer body 10, respectively, on different surfaces of the dielectric layers 11.

The internal electrode layers 13 and 15 may contain a conductive material, and in a case in which the dielectric layer 11 is formed of a ceramic material, the conductive material may be a single metal or a metal alloy having a melting point higher than a sintering temperature of the ceramic.

Since the internal electrode layers 13 and 15 are connected to external electrodes 20 to be described below, they may be connected to an external power supply through the external electrodes 20. Therefore, electric charges may be introduced into the multilayer body 10 through the internal electrode layers 13 and 15.

The external electrodes 20 may contain a conductive material, and be formed on external surfaces of the multilayer body 10 to apply electric charges having different polarities to adjacent internal electrode layers 13 and 15.

Referring to FIG. 2, the external electrodes 20 may include two external electrodes 21 and 23 covering both side surfaces of the multilayer body 10. For instance, a first external electrode 21 may be formed on one surface of the multilayer body 10 to be connected to the internal electrode layers 13 extended to one end of the multilayer body 10, and a second external electrode 23 may be formed on the other surface of the multilayer body 10 to be connected to the internal electrode layers 15 extended to the other end of the multilayer body 10.

Meanwhile, although a case in which the first and second external electrodes 21 and 23 are symmetrically formed on both side surfaces of the multilayer body 10 has been illustrated in FIG. 2, it is only an example, and may be variously modified in a design or a process. By way of example, the first external electrode 21 may cover one surface and an upper surface of the multilayer body 10, and the second external electrode 23 may cover the other surface and a lower surface of the multilayer body 10.

The external electrode 20 may contain a conductive material. Here, the conductive material may include at least one of copper, nickel, and alloys thereof. The conductive material may be variously modified depending on a design, process convenience, or the like, in a relationship with a material forming the internal electrode layers 13 and 15 and first copper layers 30 to be described below.

The external electrode 20 may contain glass frit. The glass frit may prevent characteristics of the embedded device 100 according to the present exemplary embodiment from being deteriorated due to ionization of the conductive material of the internal electrode layers 13 and 15 or the conductive material of the external electrode 20.

The first copper layer 30 may be formed on external surfaces of the external electrodes 20 to cover the external electrodes 20, and the second copper layer 40 may be formed on the first copper layer 30 to cover the first copper layer 30. Here, particles of the first copper layer 30 may have a size greater than that of the second copper layer 40.

Referring to FIG. 3, the size of the particles refers to an average size of the particles formed in respective copper layers 30 and 40, which will be used as having this meaning below.

In addition, although FIG. 3 is an enlarged view of part B of FIG. 2, FIG. 3 illustrates the external electrode 20 rather than the second external electrode 23 for convenience of explanation, since the external electrodes 20, the first copper layers 30, and the second copper layers 40 of the embedded device 100 according to the present exemplary embodiment are symmetrically formed on both ends of the multilayer body 10.

The glass frit generally contained in the external electrode 20 may absorb a laser beam at the time of forming a via hole in a printed circuit board 1000 having an embedded device to be described below, thereby decreasing precision of the formed via hole. In order to prevent this problem, a metal layer may be formed on the external electrode 20.

When the metal layer is formed using a copper plating solution on the external electrode 20, because the copper plating solution is alkaline, the glass frit contained in the external electrode 20 may be eroded. When the glass frit is eroded, fine pores or paths may be formed in the external electrode 20, such that moisture and a copper component of the copper plating solution may remain in the external electrode 20 or the internal electrode layers 13 and 15. Therefore, a defect rate, due to plating cracks, may be increased, and characteristics of the embedded device may be deteriorated, such that reliability of the embedded device may be deteriorated.

The first copper layer 30 may be directly formed on the external surfaces of the external electrodes 20 to cover the external electrode 20, and particles of the first copper layer 30 may have a size greater than that of the second copper layer 40 that do not directly contact the external electrode 20.

In a case of a polycrystalline metal, the larger the size of crystals (particles), the smaller the area of a particle boundary in the same volume. Generally, cracking or defects in a crystalline material may be generated along particle boundaries. When a size of the crystals (particles) is relatively large, an area of the particle boundary becomes small, such that the number of generated cracks and the possibility that the cracks will be generated may be decreased.

Therefore, the particles of the first copper layer 30 directly contacting the external electrode 20 may be formed to be larger than the particles of the second copper layer 40, thereby significantly decreasing a particle boundary. The particle boundary may be significantly decreased, such that the number of cracks that may be generated in the first copper layer 30 may be decreased. Therefore, the possibility that the external electrode 20 will be exposed externally may be decreased, and the reliability of the embedded device 100 according to the present exemplary embodiment may be improved.

In a case of forming the copper layer through plating, a size of copper particles formed on a target to be plated may be represented by a function of current density, a concentration of a plating solution, and time. When the first copper layer 30 is formed, a current density is increased and a plating time is shortened, whereby the size of the particles of the first copper layer 30 may be increased.

By doing so, in the embedded device 100 according to an exemplary embodiment in the present disclosure, a time during which the external electrodes 20 are exposed to the copper plating solution at the time of forming the first copper layers 30 is shortened, whereby the erosion of the glass frit may be significantly decreased. Therefore, moisture resistance reliability and operational lifespan reliability of the embedded device 100 may be increased.

Here, the first copper layer 30 may be formed to have a thickness of 0.1 μm to 4 μm. This will be described with reference to Table 1.

Here, the first copper layer 30 was formed by plating. In a case in which a thickness of the first copper layer 30 is less than 0.1 μm, the first copper layer 30 may be thin, such that breakages and defects may be generated in the first copper layer 30. In a case in which breakages are generated in the first copper layer 30, the external electrode 20 and the internal electrode layer 13 may be exposed externally, such that the moisture resistance reliability and the operational lifespan reliability of the embedded device 100 may be decreased.

In addition, in a case in which a thickness of the first copper layer 30 exceeds 5 μm, a spreading defect in which the first copper layer 30 is plated on the upper surface of the multilayer body 10 rather than the external electrode 20 may be generated. In a case in which the spreading defect is generated, precision in forming a via hole may be decreased at the time of forming the via hole, such that defects may be generated in the printed circuit board 1000.

TABLE 1

| Thickness (μm) of First Copper Layer | Form of First Copper Layer | Appearance of Device | Moisture Resistance Reliability of Device | Operational Lifespan Reliability of Device |
| --- | --- | --- | --- | --- |
| 0.05 | Broken | OK | FAIL | FAIL |
| 0.1 | Uniform | OK | PASS | PASS |
| 0.3 | Uniform | OK | PASS | PASS |
| 0.5 | Uniform | OK | PASS | PASS |
| 1.0 | Uniform | OK | PASS | PASS |
| 2.0 | Uniform | OK | PASS | PASS |
| 3.0 | Uniform | OK | PASS | PASS |
| 4.0 | Uniform | OK | PASS | PASS |
| 5.0 | Uniform | Spread | PASS | PASS |
| 6.0 | Uniform | Spread | PASS | PASS |

Therefore, it may be preferable that the first copper layer 30 is formed to a thickness of 0.1 μm to 4 μm on the external surface of the external electrode 20.

By doing so, in the embedded device 100 according to an exemplary embodiment in the present disclosure, the moisture resistance reliability and the operational lifespan reliability of the embedded device 100 may be improved by limiting a thickness of the first copper layer 30.

Figure 4:
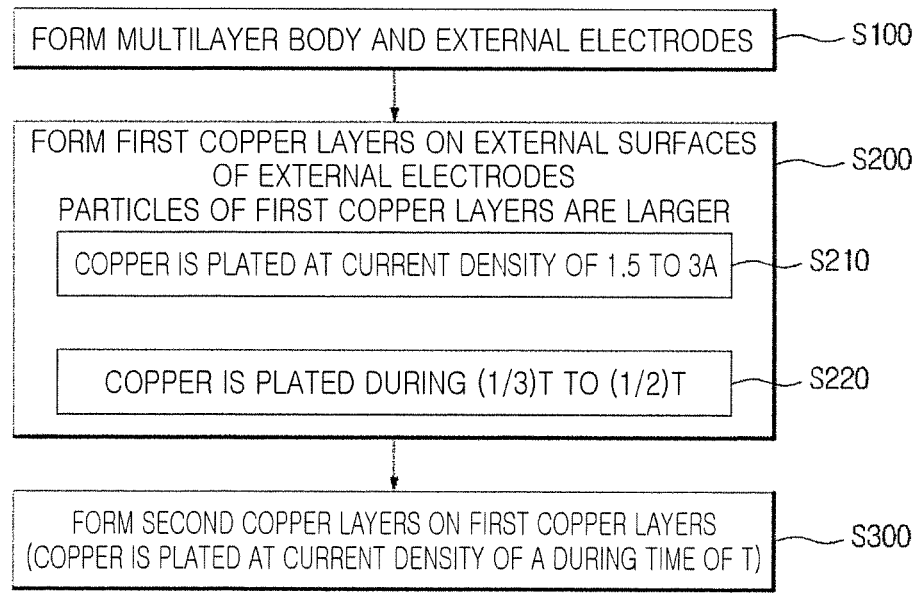
FIG. 4 is a flow chart illustrating a method of manufacturing an embedded device according to an exemplary embodiment in the present disclosure.

FIG. 4 is a flow chart illustrating a method of manufacturing an embedded device according to an exemplary embodiment in the present disclosure.

As illustrated in FIG. 4, a method of manufacturing an embedded device according to an exemplary embodiment in the present disclosure may start with forming the multilayer body 10 and the external electrodes 20 (S100).

Dielectric sheets containing a dielectric material and first conductive paste may be prepared, and be alternately stacked to form a sintered body. Second conductive paste may be applied to external surfaces of the sintered body and be then co-sintered to form the multilayer body 10 and the external electrodes 20.

The dielectric sheets may be formed by a doctor blade method, or the like, by mixing ceramic powder particles, a binder, and sintering additives with each other.

The first conductive paste may become the internal electrode layers 13 after being sintered, and be formed by mixing powder particles of the above-mentioned conductive material, an organic solvent, and the like, with each other.

The second conductive paste may become the external electrodes 20 after being sintered, and may be formed by mixing powder particles of the above-mentioned conductive material, glass frit, a base resin, and the like, with each other.

Next, the first copper layers 30 may be formed on the external surfaces of the external electrodes 20 (S200), and the second copper layers 40 may be formed on the first copper layers 30 (S300). Here, particles of the first copper layers 30 may have a size greater than that of the second copper layers 40.

The first and second copper layers 30 and 40 may be formed through electroplating. Here, the first copper layers 30 may be plated at a current density 1.5 to 3 times higher than a current density at which the second copper layers 40 are plated (S210). In addition, the first copper layers 30 may be plated during ⅓ to ½ of a period of time during which the second copper layers 40 are plated (S220).

When the first copper layers 30 are plated on the external electrodes 20, current density is increased and a plating time is shortened, whereby the size of the particles of the first copper layers 30 may be increased as compared with the size of the particles of the second copper layers 40. For instance, the current density may be increased so that the first copper layers 30 may be formed to a desired thickness while a time during which the external electrodes 20 are exposed to the copper plating solution is shortened.

By doing so, in the method of manufacturing an embedded device according to an exemplary embodiment in the present disclosure, the time for which the external electrodes 20 are exposed to the copper plating solution may be shortened. Therefore, the erosion of the glass frit of the external electrodes 20 may be significantly decreased, such that the moisture resistance reliability and the operational lifespan reliability of the embedded device 100 may be increased.

Figure 5:
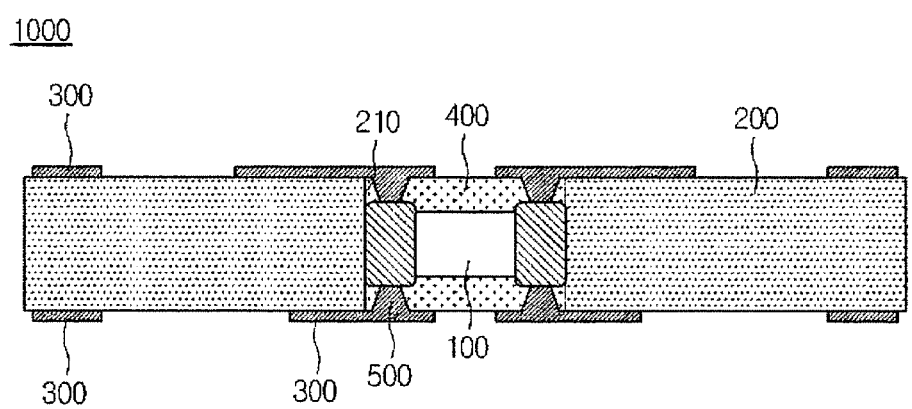
FIG. 5 is a cross-sectional view of a printed circuit board having an embedded device according to an exemplary embodiment in the present disclosure.

FIG. 5 is a cross-sectional view of a printed circuit board having an embedded device according to an exemplary embodiment in the present disclosure.

As illustrated in FIG. 5, a printed circuit board 1000 having an embedded device may include the embedded device 100, a core part 200, and a circuit pattern 300, and may further include a filler 400 and a conductive through-hole 500.

The embedded device 100 may be embedded in a core part 200 to be described below in order to perform a specific function, and may include the dielectric layers 11, the internal electrode layers 13, the external electrodes 20, and the copper layers 30 and 40. Since these components have been described above in detail, descriptions thereof will be omitted hereinafter in order to avoid overlapping descriptions.

The core part 200 may have a cavity 210 formed therein such that the embedded device 100 may be embedded therein.

The core part 200 may be formed of polymer resin generally used as an interlayer insulating material. As an example, an epoxy-based resin such as prepreg, FR-4, Bismaleimide Triazine (BT), Ajinomoto Build-up Film (ABF), or the like, may be used.

The cavity 210 may be a space of the core part 200 in which the embedded device 100 is embedded. The cavity 210 may be formed by processing the core part 200 formed as a single body, but is not limited thereto. For instance, the cavity 210 may also be formed by disposing first and second cores formed separately from each other to be spaced apart from each other by a predetermined distance. Likewise, although the case in which the cavity 210 is a single cavity has been illustrated in FIG. 5, there may be a plural number of cavities 210.

Although the cavity 210 opens both of upper and lower surfaces of the core part 200 has been illustrated in FIG. 5, the cavity 210 may be modified to open a portion of the upper or lower surface of the core part 200. When the cavity 210 only opens the upper surface of the core part 200, a via for connecting the external electrodes 20 and a circuit pattern 300, to be described below, to each other may be formed on a lower end portion of the core part 200 in which the cavity 210 is formed.

The circuit pattern 300 may be formed on the core part 200. The circuit pattern 300 may be formed by removing a portion of a conductive layer formed on at least one surface of the core part 200 or be formed by forming a conductive material on partial regions of at least one surface of the core part 200.

Although a case in which the circuit patterns 300 are formed on both surfaces of the core part 200 has been illustrated in FIG. 5, this is only an example, and the circuit pattern 300 may also be formed on only one surface of the core part 200.

In the printed circuit board 1000 having an embedded device according to an exemplary embodiment in the present disclosure, the embedded device 100 may be embedded in the core part 200, whereby slimness and lightness of the printed circuit board 1000 having an embedded device may be implemented. In addition, since the deterioration of the characteristics of the embedded device 100 may be prevented, as described above, deterioration of characteristics of the printed circuit board 1000 having an embedded device may be prevented.

The filler 400 may be interposed between at least a portion of an inner peripheral surface of the cavity 210 and the embedded device 100. For instance, the cavity 210 of the core part 200 may be filled with the filler 400 to limit displacement of the embedded device 100 embedded in the cavity 210.

The filler 400 may be a solid-phase non-conductive material after being provided in the cavity 210 in liquid-phase ink form and a solvent may be evaporated, by way of example. In addition, prepreg in a semi-hardened state may also be used as the filler 400.

The conductive through-hole 500 may be formed in the filler 400 to electrically connect the circuit pattern 300 and the external electrodes 20 to each other. The through-hole 500 may be formed by forming a via hole in the filler 400 to expose the embedded device 100 and filling the via hole with a conductive material.

As set forth above, according to exemplary embodiments in the present disclosure, the deterioration of the characteristics of the embedded device may be prevented.

While exemplary embodiments have been shown and described above, it will be apparent to those skilled in the art that modifications and variations could be made without departing from the scope of the present invention as defined by the appended claims.

What is claimed is:

1. An embedded device comprising:
a multilayer body including dielectric layers and internal electrode layers interposed between adjacent dielectric layers;
external electrodes disposed on external surfaces of the multilayer body to apply electric charges having different polarities to adjacent internal electrode layers, the external electrodes containing a conductive material;
first copper layers disposed on external surfaces of the external electrodes to cover the external electrodes; and
second copper layers disposed on the first copper layers to cover the first copper layers,
wherein the conductive material is copper (Cu), and
wherein an average particle diameter of powder particles of the first copper layers is greater than an average particle diameter of powder particles of the second copper layers.

2. The embedded device of claim 1, wherein the first copper layers have a thickness of 0.1 μm to 4 μm.

3. The embedded device of claim 1, wherein the first copper layers are plating layers.

4. The embedded device of claim 1, wherein the second copper layers are plating layers.

5. The embedded device of claim 1, wherein the first and second copper layers are plating layers.

6. A printed circuit board having an embedded device, comprising:
the embedded device of claim 1;
a core part having a cavity; and
a circuit pattern formed on the core part,
wherein the embedded device is disposed in the cavity.

7. The printed circuit board of claim 6, further comprising a filler interposed between at least a portion of an inner peripheral surface of the cavity and the embedded device.

8. The printed circuit board of claim 6, further comprising a conductive through-hole formed in the filler to electrically connect the circuit pattern and the external electrodes to each other.

9. The printed circuit board of claim 6, wherein the first copper layers are plating layers.

10. The printed circuit board of claim 6, wherein the second copper layers are plating layers.

11. The printed circuit board of claim 6, wherein the first and second copper layers are plating layers.

12. A printed circuit board having an embedded device, comprising:
the embedded device of claim 2;
a core part having a cavity; and
a circuit pattern formed on the core part,
wherein the embedded device is disposed in the cavity.

13. A printed circuit board having an embedded device, comprising:
the embedded device of claim 3;
a core part having a cavity; and a circuit pattern formed on the core part,
wherein the embedded device is disposed in the cavity.

14. A printed circuit board having an embedded device, comprising:
the embedded device of claim 4;
a core part having a cavity; and
a circuit pattern formed on the core part,
wherein the embedded device is disposed in the cavity.

15. A printed circuit board having an embedded device, comprising:
the embedded device of claim 5;
a core part having a cavity; and
a circuit pattern formed on the core part,
wherein the embedded device is disposed in the cavity.

* * * * *